(No Model.)

U. BACHMANN.
AUTOMATIC FILLING FAUCET.

No. 348,372. Patented Aug. 31, 1886.

Witnesses,
Geo. H. Strong.
J. H. Rouse.

Inventor,
U. Bachmann
By Dewey & Co.
attys

UNITED STATES PATENT OFFICE.

ULRICH BACHMANN, OF ST. HELENA, CALIFORNIA.

AUTOMATIC FILLING-FAUCET.

SPECIFICATION forming part of Letters Patent No. 348,372, dated August 31, 1886.

Application filed April 21, 1886. Serial No. 199,711. (No model.)

*To all whom it may concern:*

Be it known that I, ULRICH BACHMANN, of St. Helena, Napa county, State of California, have invented an Improvement in Automatic Filling-Faucets; and I hereby declare the following to be a full, clear, and exact description of the same.

My invention relates to the class of apparatus used in transmitting a liquid from one receptacle to another, and which may be termed "filling-faucets."

The object of my invention is to automatically shut off the flow of liquid when the receptacle into which it is being transmitted is full, thus avoiding waste.

The particular use of my faucet is in transferring wine and other liquors from one cask to another. This is usually done by an ordinary siphon; but when the receiving-cask becomes full, it suddenly runs over before the siphon can be removed.

My invention consists in an elbow-pipe, one arm of which is inserted in the bung-hole of the receiving-cask, and the other has coupled to it the pipe or tube from the other cask. Within the elbow-pipe is a valve for opening and closing it. The valve is influenced by springs and is drawn back from without, being held by a pawl, said pawl being tripped by the action of a float or trigger within the receiving-cask when said cask is full, whereby the faucet is closed.

The details of construction relating to the various parts I shall hereinafter fully describe by reference to the accompanying drawings, in which—

Figure 1:
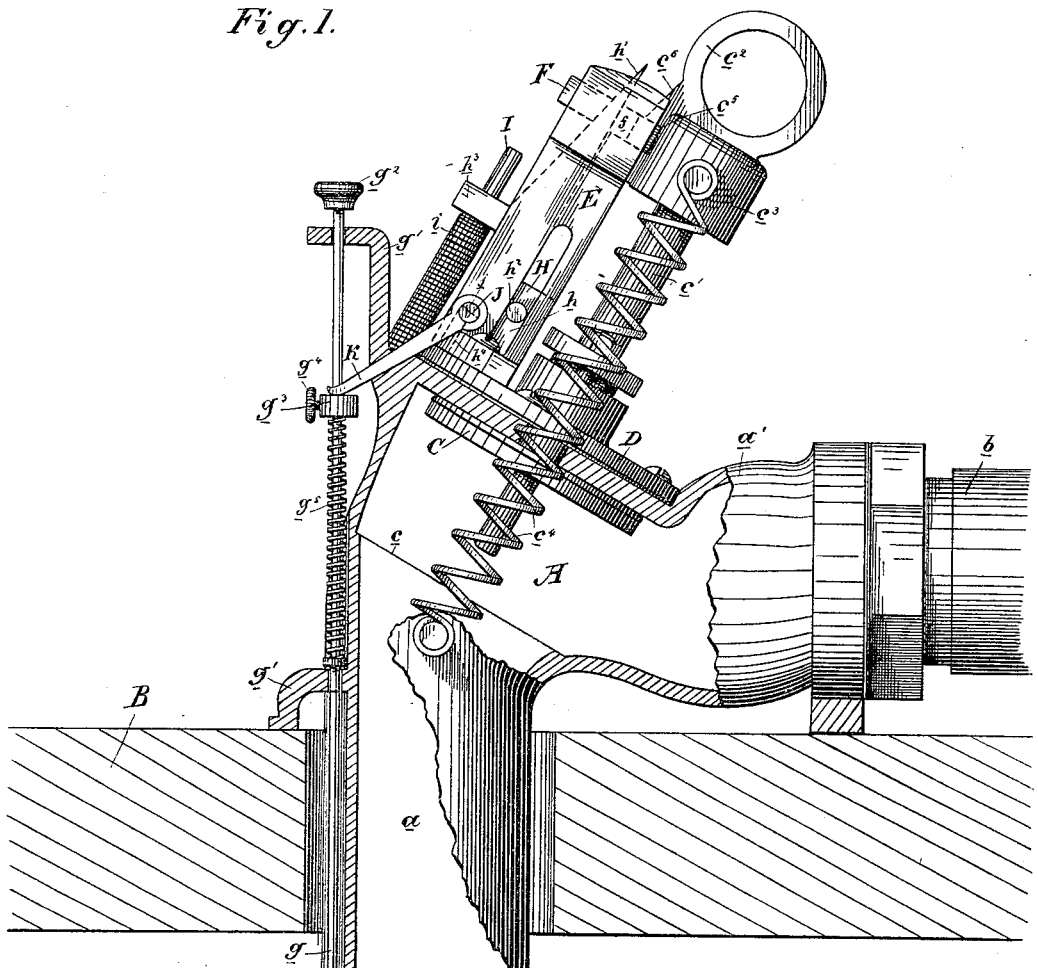
Figure 2:
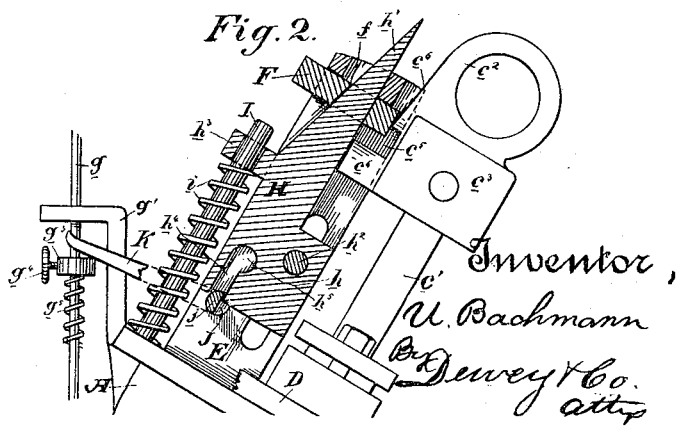

Figure 1 is an elevation of my faucet, a portion of the pipe A being broken away to show the valve C and its seat. In this figure the valve is drawn back. Fig. 2 is a section showing the bolt H and the stem of the valve about to be drawn back.

A is the pipe of the faucet, of an elbow shape, the arm $a$ being inserted in the bung of the receiving-cask B, and the arm $a'$ having coupled to it the pipe or tube $b$ from the filling-cask.

Within the pipe A is a valve-seat, $c$, upon which is fitted a valve, C, the stem $c'$ of which extends rearwardly through the back of the pipe and has a loop, $c^2$, or handle, whereby it may be pulled back. The stem $c'$ has a crosshead, $c^3$, to the ends of which springs $c^4$ are attached, the other ends of the springs being secured to the faucet-pipe A. These springs hold the valve to its seat. The valve is held back or open by the following means:

D is a head-plate bolted to the back of the pipe A, and through its center passes outwardly the stem of the valve, having suitable packing to make a close joint. To the head-plate is bolted a rearwardly-extending guide-arm, E, in the outer end of which is seated a vertically-moving gravity-pawl, F, the lower end of which engages a notch or groove, $c^5$, in a flange, $c^6$, on the head of the valve-stem $c'$. The rear end of the flange is inclined, so that when the stem $c'$ is drawn back the flange, coming in contact with the lower end of the pawl, raises it until the notch $c^5$ comes in line, when the pawl drops down into it and holds the valve-stem.

The pawl is released by the following tripping mechanism: G is a float, which forms the trigger. It is secured near its rim to a stem, $g$, which is pivoted and guided in arms $g'$ on the top of the pipe A. The stem has a head, $g^2$, by which it may readily be turned. When the arm $a$ of the pipe A is being inserted in the receiving-cask, the float G is turned so as to lie just over its end, and it thus enters the bung-hole with the arm $a$. After being thus inserted it is turned again by the stem $g$ to a position out of line with the arm, in which position it is free to move up or down to give a longitudinal movement to the stem $g$. Upon the stem is a collar, $g^3$. The guide-arm E is slotted vertically and horizontally. In the vertical slot is fitted and adapted to slide a releasing-bolt, H, consisting of a head-piece, $h$, and an extension, $h'$, the upper surface of which is an inclined plane, and said extension projects rearwardly through an opening or slot, $f$, in the pawl F. The head-piece $h$ has a cross-pin, $h^2$, projecting through the horizontal slot of arm E, and acting as a guide, and from its top projects a stud-piece, $h^3$, traveling on the top of the arm E. The stud is fitted loosely on a pin, I, secured to the pipe A, and a spring, $i$, around said pin, bears against said stud, its tendency being to force it backwardly, thus providing for the back throw of the releasing-bolt H. The bolt is held forward by a cross-pin, J, journaled in arm E, and having a half-cut, $j$, in its body, which enables it to enter a slot, $h^4$, in the head $h$ of the bolt H, and engage an enlargement, $h^5$, at the base of said slot. To one end of the cross-pin J is secured a crank-arm, K, the outer end of which rests on the collar $g^3$ of the stem $g$. It will thus be seen that when the crank-arm K is moved to rest upon the collar $g^3$ the cross-pin J is turned, so that its body engages the enlargement $h^5$ of the head $h$, thereby holding the bolt H against its spring $i$. Now, by moving back the crank-arm K the pin J is turned, so that its half-cut is in line with the slot $h^4$ in the head $h$, and the bolt H flies back under the influence of the spring $i$. In thus moving back the inclined extension $h'$ of the bolt passing through pawl F raises said pawl, so that its lower end, freeing itself from the notch $c^5$ of the valve-stem $c'$, said stem flies forward under the influence of springs $c^4$, and the valve is thus closed. In this movement forward the flange $c^6$ of the valve-stem, in which the notch $c^5$ is made, comes in contact with the head of the bolt H, and thus carries the bolt back with it to its first position.

The general operation of the faucet is as follows: The float G, being first turned in line with the arm $a$, is inserted with said arm into the bung of the receiving-cask, and the tube $b$ is connected with the other end or arm of pipe A. The valve is then drawn back by its stem $c'$, so that it opens the faucet, and it is there held by the gravity-pawl F dropping into notch $c^5$ of the valve-stem. The float is now turned out of line with the arm $a$, and the crank-arm K is thrown forward to rest on the collar $g^3$, so that the cross-pin J locks and holds the bolt H back. When the receiving-cask is full, the liquid raises or moves back the float G, thus moving the stem $g$, the collar $g^3$ of which moves back the crank-arm K, which, turning the cross-pin J, releases the bolt H. This, springing back, raises the pawl F and releases the valve-stem, which now springs forward, closing its valve and shutting off the supply of liquid.

In order to adjust the float accurately for different thicknesses of staves in the receiving-casks and to hold and return it to position, I make the collar $g^3$ adjustable on the stem, and secure it by a thumb-screw, $g^4$, and place a light spring, $g^5$, around the stem. By loosening the collar, I can slip the stem through it, and thus adjust the float accurately in the cask. The spring, though too light to resist the buoyant power of the float, is still sufficient to hold it in the position to which it is adjusted.

Having thus described my invention, what I claim as new, and desire to secure by Letters Patent, is—

1. In a filling-faucet, the pipe A, having valve-seat $c$, and the valve C, having rearwardly-projecting stem $c'$ with inclined flange $c^6$ and notch $c^5$, and springs $c^4$, for holding the valve closed, in combination with the gravity-pawl F, raised by the inclined flange and engaging the notch, whereby the valve is held back, a float within the receiving-cask acting as a trigger, and a trip between said float and the pawl F, whereby upon the rise of the liquid in the cask the pawl is released and the valve closed, substantially as herein described.

2. In a filling-faucet, the pipe A, the spring-actuated valve C, having a valve-stem with inclined flange, and a locking-pawl, F, for engaging the flange to hold the valve open, in combination with the float G, the longitudinally spring-actuated stem $g$, supporting the float, and an arm or trip between said stem and holder, whereby the latter is released, substantially as described.

3. In a filling-faucet, the pipe A, having the spring-actuated valve C, the stem $c'$ of the valve having inclined flange $c^6$ and notch $c^5$, in combination with the gravity-pawl F, engaging the notch, the float G within the receiving-cask, the longitudinally-movable stem $g$, by which the float is carried, and a trip between said stem and the pawl, by which the latter is released, substantially as herein described.

4. In a filling-faucet, the pipe A and the spring-actuated valve C, having stem $c'$ with inclined notched flange $c^6$, in combination with the gravity-pawl F, engaging the notched flange and having a slot, $f$, the spring-actuated bolt H, having an inclined extension, $h'$, fitting the slot $f$ of the pawl for releasing it, a holder for said bolt, and the float G in the receiving-cask having stem $g$, the movement of which releases the holder of the bolt, substantially as herein described.

5. In a filling-faucet, the pipe A, the valve C, having stem $c'$ with inclined notched flange $c^6$ and springs $c^4$, for holding the valve closed, and the slotted guide-arm E on the back of pipe A, in combination with the slotted gravity-pawl F in the rear of the arm and engaging the notched flange of the valve-stem, the releasing-bolt H, seated in the arm E and having an inclined extension, $h'$, passing through the slotted pawl for raising it, the spring $i$, by which the bolt is thrown back, the float G within the receiving-cask, the pivoted and longitudinally-movable stem $g$, carrying the float and having a collar, $g^3$, the cross-pin J, journaled in arm E and engaging and holding the bolt H, as described, and the crank-arm K on the pin and resting on the collar $g^3$, whereby by the movement of the stem the bolt H may be released, all arranged and adapted to operate substantially as herein described.

6. In a filling-faucet, the combination of the spring-actuated valve-stem $c'$, having a notched flange, $c^6$, and the gravity-pawl F, for engaging the notched flange, with the spring-actuated bolt H, by which the pawl is released, said bolt having a head, $h$, with which the flange $c^6$ of the valve-stem comes in contact, whereby the bolt is retured to position as the valve closes, substantially as herein described.

7. In a filling-faucet, the float G within the receiving-cask and forming a trigger for tripping the spring-actuated valve and closing the faucet, as described, said float having a stem, $g$, pivoted and longitudinally movable, an adjustable collar, $g^3$, on the stem, engaging the trip mechanism, and a spring, $g^5$, on the stem, whereby the float may be accurately adjusted, substantially as herein described.

8. A filling-faucet comprising the pipe A, the valve C, having stem $c'$ with handle $c^2$, notched flange $c^6$, and cross-head $c^3$, the springs $c^4$, connecting the cross-head with the pipe for closing the valve, the slotted guide-arm E, the slotted gravity-pawl F in said arm for engaging the notched flange of the valve-stem and holding the valve open, the releasing-bolt H in the arm E, having a head, $h$, with guide-stud $h^3$, guide-pin $h^2$, and a slot, $h^4$, with enlarged base $h^5$, and an inclined extension, $h'$, fitting the slotted pawl F, for raising it to release the valve-stem, the spring $i$, by which the bolt H is actuated, the cross-pin J, having a half-cut for engaging head $h$ of the bolt H, the crank-arm K on said pin for releasing the bolt, and the adjustable and movable float G, stem $g$, and collar $g^3$ on the stem for engaging crank-arm K, all arranged and adapted to operate substantially as herein described.

In witness whereof I have hereunto set my hand.

ULRICH BACHMANN.

Witnesses.
   W. A. C. SMITH,
   J. G. JOHNSON.